United States Patent Office 3,504,751
Patented Apr. 7, 1970

3,504,751
DRILL BIT
Tariel Georgievich Agoshashvilli, Volgogradsky prospekt 72, korpus 2, kv. 29; Anatoly Stepanovich Mokshin, Volgogradsky prospekt 58, korpus 1, kv. 48; Leonid Pavlovich Konstantinov, Lomonosovsky prospekt 23, kv. 495; and Jury Evgenievich Vladislavlev, Ulitsa Gorkogo 25, kv. 71, all of Moscow, U.S.S.R.; Eduard Lvovich Komm, Oktyabrsky prospekt 365, kv. 43, Ljubertsy, Moskovskoi oblasti U.S.S.R.; and Anatoly Petrovich Okulov, Komsomolsky prospekt 25, kv. 83; and Rudolf Moiseevich Eigeles, Suschevskaya ulitsa 8–12, kv. 37, both of Moscow, U.S.S.R.
Filed Feb. 20, 1968, Ser. No. 706,879
Int. Cl. E21b *17/00*
U.S. Cl. 175—331         2 Claims

ABSTRACT OF THE DISCLOSURE

A drill bit capable of engaging the entire area of a face with the teeth of cutters, exerting not only impact action on the face, but also slipping thereover by an optimum value depending upon the mechanical properties of the rock. This is achieved by regulation of the sizes and mutual arrangement of toothed rims on each cutter.

---

The present invention relates to drill bits used as a rock-breaking tool in rotary drilling and, more particularly, to drill bits for drilling rock possessing strong plastic properties.

It is a common knowledge that in lower intervals of deep and extra deep holes most difficult to drill, where the rock, being under a big underground pressure, features strong plastic properties, the efficiency of drilling by means of common (rock toothed) bits is not high.

To increase the efficiency of drilling by means of drill bits in plastic rock, rock bits with off set cone axes are used mostly.

In addition, rock bits with multicone barrel-shaped cutters are made use of.

When bit cutters with axes offset in plan roll over the bottom, their teeth, apart from an impact effect on the rock, slip over the latter, thus cutting or chipping it up, which fact results in a higher drilling speed.

In said bits, per revolution length of slipping caused by offsetting of the cutter axis is equal for all the cutter rims, while the face area drilled by each of the rims expands from the centre to the periphery. Therefore the mechanical speed of bit drilling generally depends upon the speed of drilling by the peripheral or close-to-peripheral rims of the drills.

On the other hand, excessive slipping of the teeth of the top or near-the-top rims of the drills reduces the service life of the bit because of their wearout which is particularly heavy in abrasive rock.

When the bits with multicone barrel-shaped drills are employed, one or several rims on each of the drills either fail to slip at all or their slipping is negligible, and they prove to be scarcely fit for breaking plastic rock.

It is an object of the present invention to eliminate the disadvantages in the afore-mentioned technical accomplishments and provide a bit ensuring a more effective drilling of plastic rock owing to a more rational arrangement of the drill rims thereof.

This object has been accomplished by providing a drill bit with several drills, each drill having several tooth wheel rims. According to the invention, in at least two of the drills there are one rim (R) with a mean radius $r_\mathrm{b}$ and an effective edge length $l_\mathrm{b}$, the radius $r_\mathrm{b}$ of at least one drill being bigger than the radius of a recurring rim of the other drill, the following relationship being conformed to between the lengths of the cutting edges of the teeth and the mean radii of the corresponding rims of the cutters:

$$K_1 \Sigma l_\mathrm{a} r_\mathrm{a} + K_2 \Sigma l_{\mathrm{a}'} r_{\mathrm{a}'} < l_\mathrm{b} r_\mathrm{b} > K_1 \Sigma l_\mathrm{c} r_\mathrm{c} + K_2 \Sigma l_{\mathrm{c}'} r_{\mathrm{c}'}$$

Said relationship providing for the passage of an instantaneous axis of rotation of the bit cutter through the intersection point of the axes of both the bit and the cutter and through the effective edge of the rim R, where:

$l_\mathrm{b}$ and $r_\mathrm{b}$ are the effective edge length and the mean radius of the rim R respectively through which the instantaneous rotation axis of the drill runs;

$\Sigma l_\mathrm{a} r_\mathrm{a}$ stands for the sum total of the products of the effective edge length of a tooth and the mean radius of the rims the effective edges of whose teeth are located farther than the instantaneous rotation axis of the drill from the axis of said drill and higher than the effective edge of the lower tooth of the rim R with relation to the bit axis;

$\Sigma l_{\mathrm{a}'} r_{\mathrm{a}'}$ is the same for the rims located lower than the effective edge of the lower tooth of the rim R with relation to the bit axis;

$\Sigma l_\mathrm{c} r_\mathrm{c}$ symbolize the sum total of the products of the length of the tooth cutting edge and the mean radius of the rims the cutting edges of whose teeth are located closer than the instantaneous rotation axis of the cutter from the axis of the latter and higher than the cutting edge of the lower tooth of the rim R with relation to the bit axis;

$\Sigma l_{\mathrm{c}'} r_{\mathrm{r}'}$ is the same for the rims the cutting edges of whose teeth are located lower than the effective edge of the lower tooth of the rim R;

Factor $K_1 = 0.6$–$0.8$ for the rims the cutting edges of whose teeth are located with relation to the bit axis higher than the cutting edge of the lower tooth of the rim R; and Factor $K_2 = 1.2$–$1.5$ for the rims the cutting edges of whose teeth are located with relation to the bit axis lower than the effective edge of the lower tooth of the rim R.

Implied by the length of the tooth effective edge is the projection of the width of the rim on a line perpendicular to the axis of the bit.

Implied by the "recurring" or "overlapping" rim of another cutter is a rim located as far from the bit axis as the recurred rim of the first cutter.

Implied by the "mean" radius of a rim is a radius normal to the midpoint of the cutting edge of the tooth of said rim.

Implied by the expression with relation to the bit axis "higher" (or "lower") than the cutting edge of the lower tooth of the rim R is a position of the projection, on the bit axis, of the cutting edge of a tooth being in an extreme low position with relation to the projection of a cutting edge of a tooth of the rim R, which is also in the lowest position.

Thereby, the effective edges of the other toothed rims in each drill cutter should be displaced in relation to the instantaneous axis of rotation of the drill cutter under consideration.

With the bit rotating each of its cutters rolls over the bottom face by the "leading" rim R, i.e., the rim through which passes the instantaneous rotation axis of the cutter. By arranging the cutting edges of the teeth of the rest ("slipping") rims at rated distances from the instantaneous rotation axis, these rims are capable of carrying out an optimum specific slipping over the bottom and its effective breakage.

Furthermore, during the impact of the leading rims on a plastic rock their teeth create a "rack" (alternating toothed prominences and depressions) which is also well destroyed during a subsequent impact thereon by the slipping rims capable of a preset optimum specific slipping over the bottom.

The optimum values of specific slipping for each group of rocks are established through tests. Referred to as the optimum is such a specific slipping which precludes the formation of a "rack" under the slipping rims on the bottom. Tentative limits of optimum specific slippings for plastic rock are 10 to 30%. The more plastic the rock, the greater the values of specific slipping.

Thus, a drill bit according to the invention, when employed, ensures an effective drilling of plastic rock.

The invention will be more apparent from the following description of an embodiment thereof and the drawings, wherein.

Figure 1:
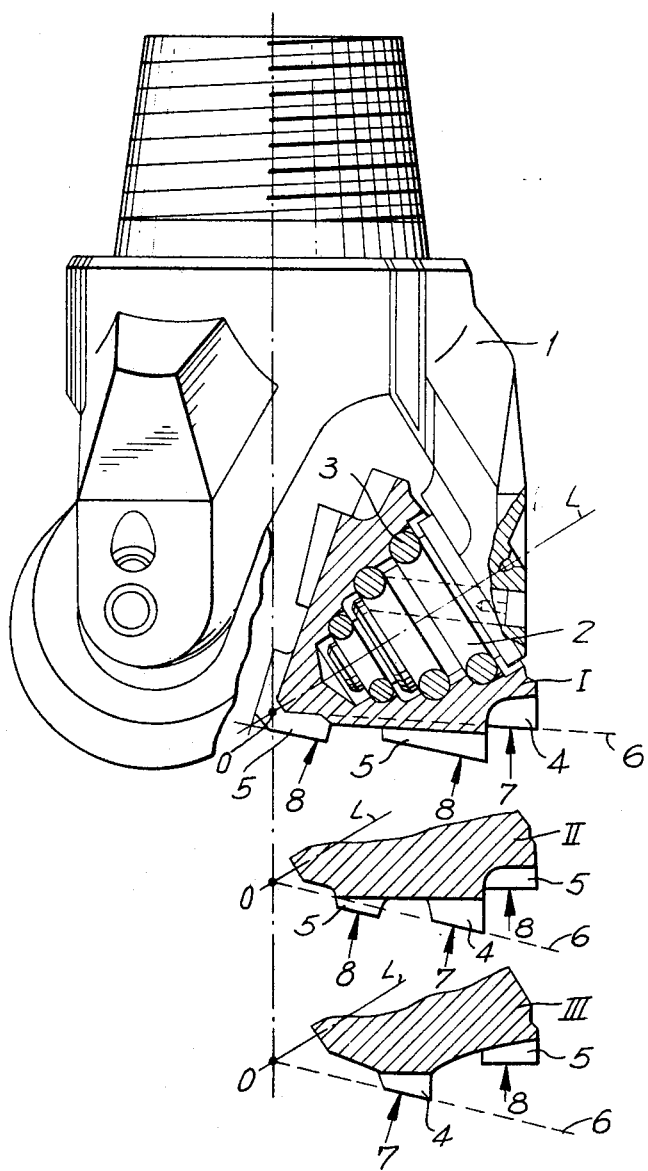
FIG. 1 shows a drill bit according to the invention in an exemplary embodiment.

A drill bit (FIG. 1) is made up of three claws 1 with pins 2, cutters being mounted on each of said pins by means of a three-row ball bearing 3. Each cutter has one leading rim 4 and several rims 5 with a preset optimum slipping. The lines OL show the positioning of axes of the cutters; dotted lines 6 indicate the calculated positions of the instantaneous rotation axes of the cutters, which pass through an intersection point O of the cutter axes with the bit axis and the cutting edge 7 of the leading rims.

In the exemplary embodiment of the bit described herein the leading rim of the cutter I is a peripheral rim 4 overlapped by the slipping peripheral rims 5 of the cutters II and III, a middle (second from the periphery) rim is the leading rim of the cutter II; a rim located closer to the bit axis is the leading rim of the cutter III. The leading rims of the cutters II and III are overlapped by one of the middle slipping rims of the cutter I. The cutting edges 8 of all the slipping rims are located with relation to the instantaneous rotation axes of the corresponding cutter at calculated distances ensuring the preset values of slipping of these rims over the bottom.

Figure 2:
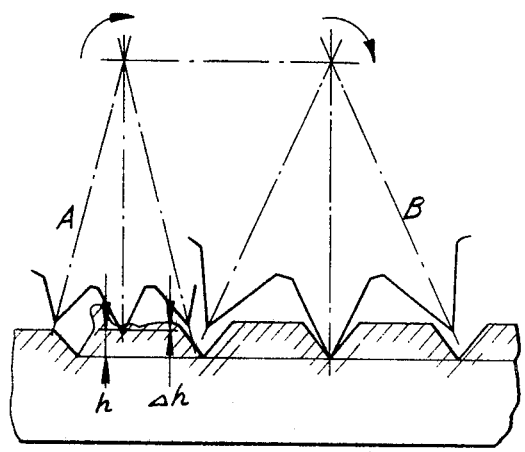
FIG. 2 is a diagram of the overlapping of the bottom of the "leading" rim of one cutter by the "slipping" rim of another cutter.

The leading rim (FIG. 2, position B) on the face forms a rack whose prominences up to a height $h$ are destroyed by the teeth of the slipping rim (FIG. 2, position A) of another cutter leaving the foundation of the rack on the bottom. A difference in the values of intrusion of the slipping rim ($\Delta h$) and the leading rim ($h+\Delta h$) it overlaps is necessary to offer resistance to the slipping of the leading rim (FIG. 2, position B) on the bottom.

The value $h$ is assumed to be within the limits of 2 to 4 mm. and is selected depending upon the mechanical properties of the rock to be drilled by said bit; the greater the hardness of the rock, the smaller the value $h$.

Figure 3:
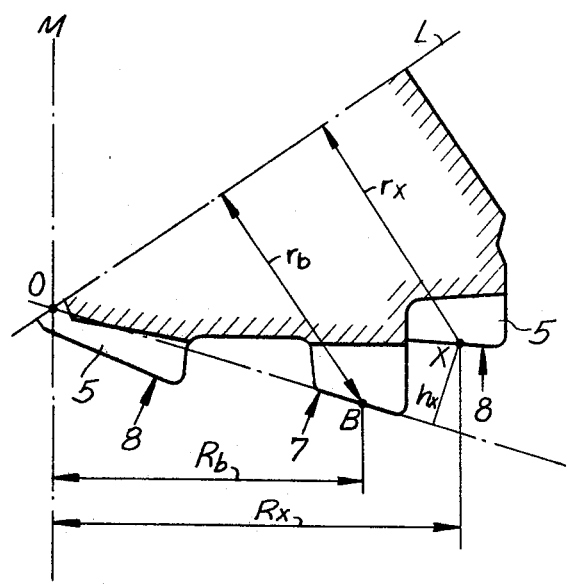
FIG. 3 is a designed profile of the cutter.

Serving as the condition for the leading rim 4 (FIG. 3) to roll over on the bottom without slipping is the exceeding as to an absolute value of the moment of resistance to the sleeping of the leading rim 4 over the moments of resistance to the sleeping of the rims located farther and closer than the instantaneous rotation axis of the cutter from the axis of the latter, in particular. The position of the instantaneous axis of rotation coincides with a line passing through the intersection point O of the axes of the bit (OM) and the cutter (OL) and through a cutting edge 7 of the tooth of the leading rim 4.

The value of a relative rotational speed of the cutter will be $$\omega_c \approx \frac{R_b}{r_b} \cdot \omega_g$$

where $r_b$ and $R_b$ are respective distances (radii) between the point B lying in the middle of the cutting edge of the tooth of the leading rim 4 and the axes of the cutter (OL) and the bit (OM);

$\omega_g$ is the rotation speed of the bit.

The speed of slipping of any point X on the edge 8 of the rim 5 of the cutter at the moment of its contact with the bottom is determined by a formula:

$$V_x \approx \Omega h_x = \omega_g \left( R_x - r_x \frac{R_b}{r_b} \right)$$

where $\Omega$ is the instantaneous rotational speed of the cutter;

$h_x$ Is the shortest distance from the point X under consideration to the instantaneous rotational speed of the cutter.

For one revolution of the bit the length of slipping of the cutter circumference whereon lies the point X under consideration will be found from a formula:

$$S_x \approx 2\pi \left( R_x - r_x \frac{R_b}{r_b} \right)$$

where $r_x$ and $R_x$ are respective distances (radii) from the point X lying on the cutting edge 8 of the tooth of the rim 5 under consideration to the axes of the cutter (OL) and bit (OM).

For an effective breakage of the bottom it is necessary to ensure equal specific slipping of all the rims except the leading ones.

The specific value of sliping ($X_x^s$) in percent of the total length of the face periphery under consideration is expressed by a formula:

$$S_x \approx \left( 1 - \frac{r_x}{R_x} \cdot \frac{R_b}{r_b} \right) 100\%$$

Follows an exemplary sequence of the realization of the present invention:

(1) Established tentatively is a rational value of specific slipping of the drill teeth over the face for a given rock, which precludes the formation of a "rack" (deep prominences and depressions) under the slipping rims.

Rough limits of the optimum specific slipping for plastic rock $S_x = 10-30\%$. The more plastic the rock, the smaller values of specific slipping.

(2) The rational value $h$, the difference between the radii of the leading and recurring rims of the cutters, varies within 2 to 4 mm. The harder the rock, the smaller the value $h$.

(3) A rough diagram of positioning of the rims in the cutters is drawn, the positions of the instantaneous rotation axes of the cutters are plotted and a relation $$i = \frac{\omega_d}{\omega_g}$$

is established. This relation may be determined by dividing the distance from any point of the instantaneous rotation axis to the bit axis by the distance from that very point to the cutter axis. To a first approximation, the widths of the leading and slipping rims are assigned at will for design reasons.

(4) To be refined are the radii of the slipping rims according to the formula $$S_x = 1 - \frac{r_x}{R_x} \cdot i$$

by finding out the value $r_x$ at a preset $S_x$ for the values $R_x$.

(5) Accoring to the formula $$K_1 \Sigma l_a r_a + K_2 \Sigma l_{a'} r_{a'} < l_b r_b > K_1 \Sigma l_c r_c + K_2 \Sigma l_{c'} r_{c'}$$

given above, the widths of the leading and slipping rims, i.e., the lengths of the cutting edges of the teeth of these rims, are likewise refined.

The positioning of the rims on the cutters and a subsequent specification of the cutter profiles are carried out with due regard for the necessity of maintaining the required clearances between the cutters in the bit and the required size of the bit bearings.

The invention is not limited by an exemplary embodiment described hereinabove, and various alterations and modifications can be made within the essence and scope of the claims which follow.

What is claimed is:
1. A drill bit comprising a plurality of cutters, each of which is provided with several overlapped toothed rims, in which at least two cutters each have one rim whose means radius is greater than the radius of the rim of another cutter overlapped thereby, the said one rims of at least two cutters being located at different distances from the bit axis, the lengths of the cutting edges of the teeth and the mean radii of the respective rims of each cutter being in a relationship to ensure the passage of the instantaneous rotation axis of the cutter through the intersection point of the bit axis and through the effective edge of he said one rims, said relationship satisfying the expression:

$$K_1 \Sigma l_a r_a + K_2 \Sigma l_{a'} r_{a'} < l_b r_b > K_1 \Sigma l_c r_c + K_2 \Sigma l_{c'} r_{c'}.$$

wherein: $l_b$ and $r_b$ are the length of the cutting edge of a tooth and the mean radius of the said one rim of a particular cutter passing through which is the instantaneous rotation axis, respectively;

and $l_a$ and $r_a$ are the length of the cutting edge of a tooth and the mean radius of the rims whose cutting edges are located farther than the instantaneous rotation axis of the cutter from the axis of the latter, and with relation to the bit axis higher than the cutting edge of a lower tooth of the said one rim, respectively, $l_{a'}$ and $r_{a'}$ being the same for rims located with regard to the bit axis lower than the cutting edge of the lower tooth of the said one rim, respectively;

$l_c$ and $r_c$ are the length of the cutting edge of the tooth and the mean radius of the rims whose cutting edges are located closer than the instantaneous rotation axis from the axis of the latter, and with relation to the bit axis higher than the effective edge of the lower tooth of the said one rim, respectively;

$l_{c'}$ and $r_{c'}$ and the same for the rims, the cutting edges of whose teeth are located lower than the effective edge of the lower tooth of the said one rim, respectively;

$$K_1 = 0.6 - 0.8$$

$$K_2 = 1.2 - 1.5$$

the effective edges of the other toothed rims in each cutter being displaced in relation to the instantaneous rotation axis of a cutter under consideration.

2. A drill bit according to claim 2, wherein the effective edges of said toothed rims in each cutter are displaced in relation to the instantaneous rotation axis of such cutter at distances given by the formula:

$$S_x = 1 - \frac{r_x}{R_x} \cdot i$$

$r_x$ and $R_x$ are distances from a point X lying on the effective edge of a tooth of the rim under consideration to the axes of the cutter and bit, respectively;

$$i = \frac{\omega_d}{\omega_g}$$

is the ratio of rotational speeds of the cutter under consideration and the bit.

References Cited

UNITED STATES PATENTS

| | | | |
|---|---|---|---|
| 1,896,251 | 2/1933 | Scott | 175—378 |
| 1,897,588 | 2/1933 | Reed | 175—378 |
| 2,027,700 | 1/1936 | Rogatz | 175—378 |
| 2,203,846 | 6/1940 | Stancliff | 175—378 |
| 2,248,339 | 7/1941 | Catland | 175—378 |
| 2,333,746 | 11/1943 | Scott | 175—376 |
| 3,126,973 | 3/1964 | Kiel | 175—378 |

NILE C. BYERS, JR., Primary Examiner